United States Patent
Sakakibara et al.

(10) Patent No.: US 9,456,100 B2
(45) Date of Patent: Sep. 27, 2016

(54) SHEET CONVEYING DEVICE AND IMAGE READING DEVICE WITH MOVABLE TRAY

(71) Applicant: BROTHER KOGYO KABUSHIKI KAISHA, Nagoya-shi, Aichi-ken (JP)

(72) Inventors: Arisa Sakakibara, Nagoya (JP); Katsuro Miura, Toyota (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/580,521

(22) Filed: Dec. 23, 2014

(65) Prior Publication Data
US 2015/0189106 A1 Jul. 2, 2015

(30) Foreign Application Priority Data
Dec. 27, 2013 (JP) ................................. 2013-271978

(51) Int. Cl.
*H04N 1/04* (2006.01)
*H04N 1/00* (2006.01)

(52) U.S. Cl.
CPC .................................. *H04N 1/0057* (2013.01)

(58) Field of Classification Search
CPC ............ H04N 1/0057; B65H 2220/01; B65H 2801/39; B65H 2404/6111; B65H 3/0684; B65H 2220/02; B65H 2511/12; B65H 2511/22; C10L 1/04; C10L 5/365; C10L 5/445; Y02P 30/20; Y02P 60/877; Y02P 50/678
USPC ...... 358/498, 1.12, 474; 271/109, 264, 3.18, 271/117, 162, 207, 225, 226, 265.01, 274, 271/279, 306, 3.2, 3.22, 4.01, 4.12, 9.07; 399/107, 101, 21, 258, 264, 329, 99
See application file for complete search history.

(56) References Cited

U.S. PATENT DOCUMENTS

| | | | |
|---|---|---|---|
| 8,608,152 B2 * | 12/2013 | Takahata ................ | B65H 83/00 271/213 |
| 8,695,976 B2 * | 4/2014 | Takahata .................. | B65H 5/26 271/301 |
| 8,797,613 B2 * | 8/2014 | Sato .................... | H04N 1/00496 358/474 |

(Continued)

FOREIGN PATENT DOCUMENTS

| | | |
|---|---|---|
| JP | 2011-211478 A | 10/2011 |
| JP | 2012-012184 A | 1/2012 |
| JP | 2012-126530 A | 7/2012 |

OTHER PUBLICATIONS

"XP-800 Small-in-One Printer Quick Guide"; published by Epson America, Inc, 2012, 3 pages.

*Primary Examiner* — Negussie Worku
(74) *Attorney, Agent, or Firm* — Merchant & Gould P.C.

(57) ABSTRACT

A sheet conveying device includes: a conveyor; a first supporter for supporting an unsupplied sheet; a second supporter for supporting a discharged sheet; and a side guide contactable with an edge portion of the sheet supported by the first supporter. The first supporter has a first part located over the second supporter, with the first part and the second supporter being spaced apart from each other. The first part at least partly constitutes a first tray movable between an open position and a closed position. The side guide is provided on the first tray. The first tray is configured such that when the first tray is located at the closed position, the first supporter supports the unsupplied sheet, and when the first tray is located at the open position, a portion of the second supporter is exposed.

14 Claims, 10 Drawing Sheets

(56) References Cited

U.S. PATENT DOCUMENTS

| | | | | |
|---|---|---|---|---|
| 8,964,269 B2 * | 2/2015 | Miura | ............... | H04N 1/0057 |
| | | | | 271/3.14 |
| 9,227,801 B2 * | 1/2016 | Miura | ............... | B65H 5/068 |
| 9,309,069 B2 * | 4/2016 | Ito | ............... | B65H 3/52 |
| 9,315,348 B2 * | 4/2016 | Wakakusa | ............... | B65H 3/44 |
| 2009/0021805 A1 * | 1/2009 | Suto | ............... | H04N 1/00283 |
| | | | | 358/498 |
| 2010/0252987 A1 * | 10/2010 | Furuyama | ............... | B65H 1/04 |
| | | | | 271/3.14 |
| 2011/0242624 A1 | 10/2011 | Takeuchi et al. | | |
| 2012/0155941 A1 | 6/2012 | Kozaki et al. | | |

* cited by examiner

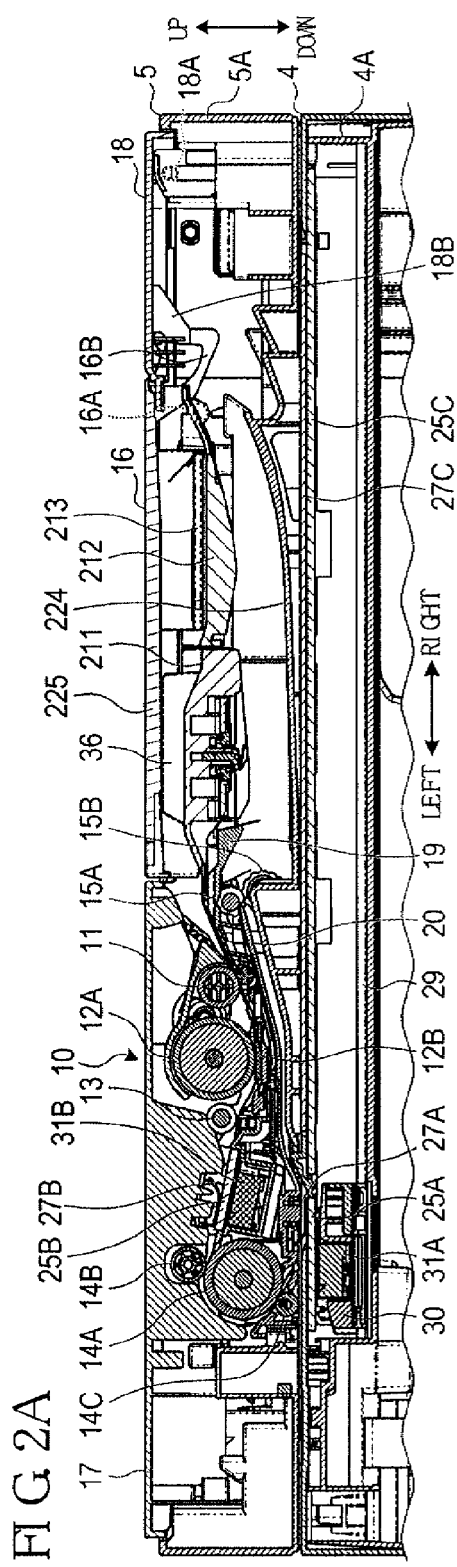
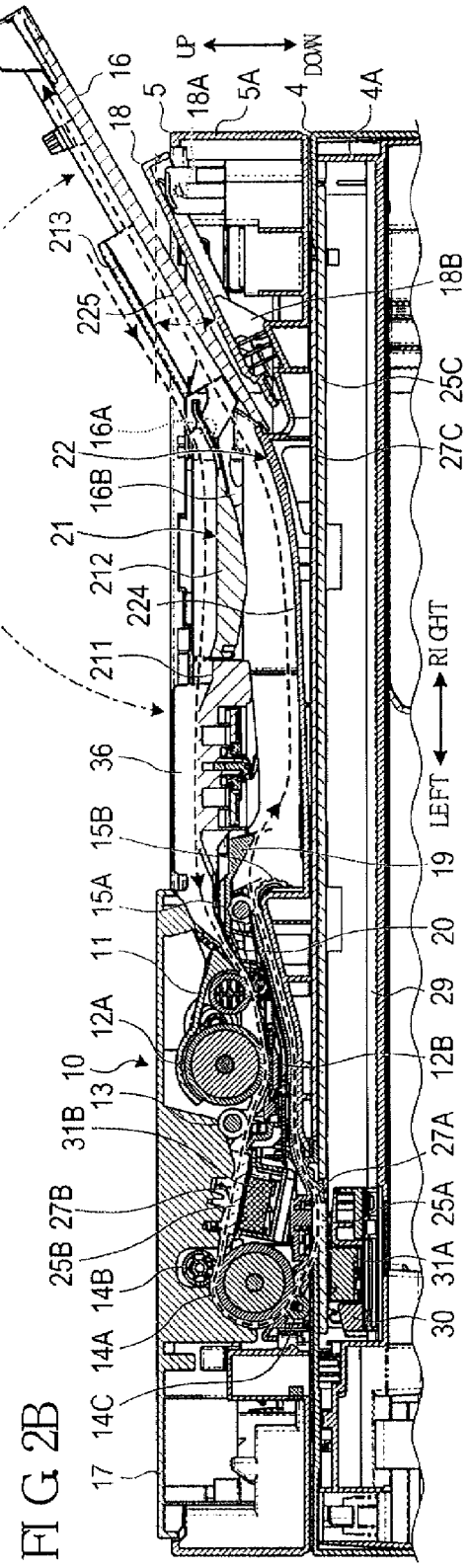

FIG. 3A
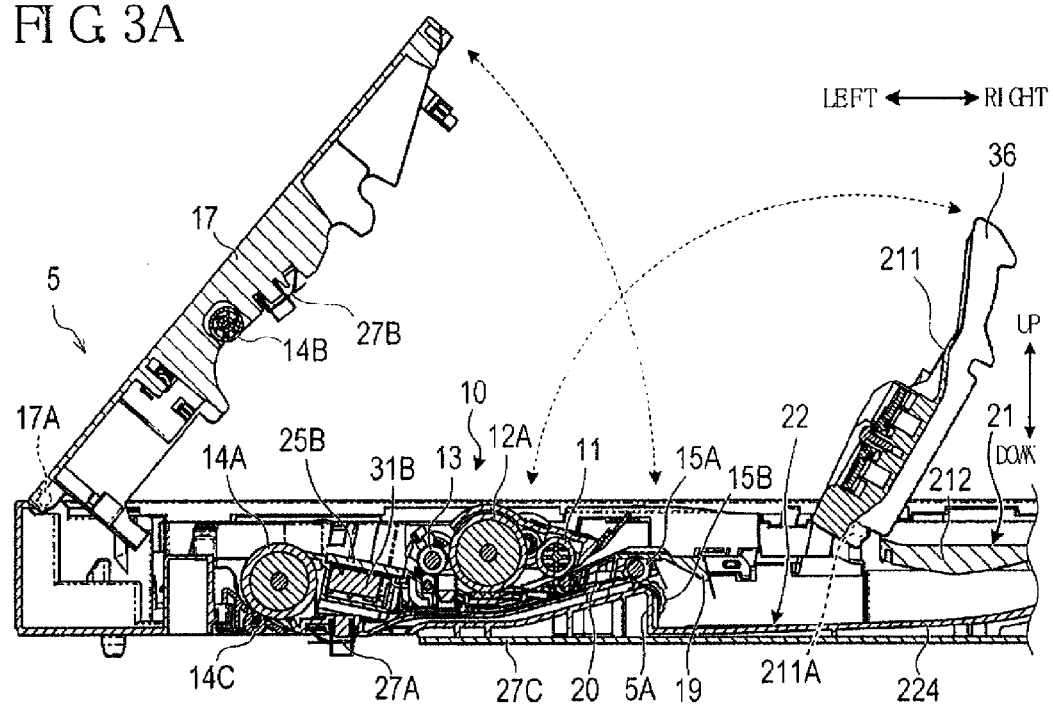
FIG. 3B
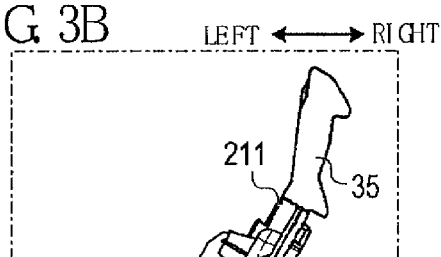
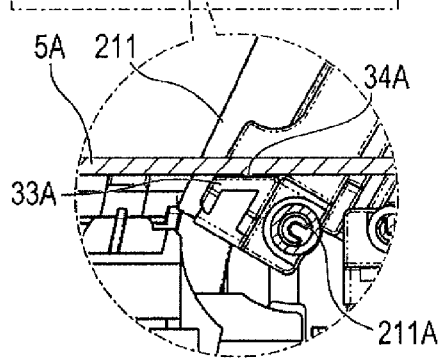
FIG. 3C
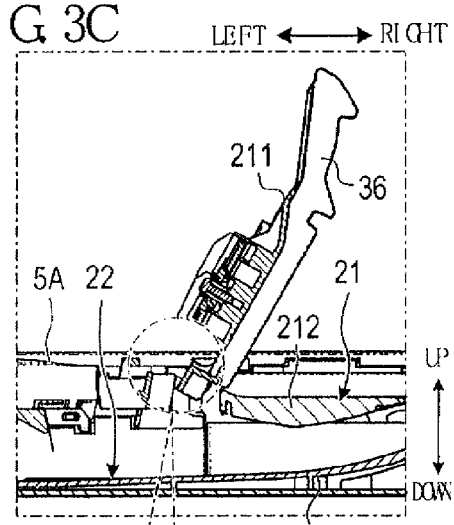
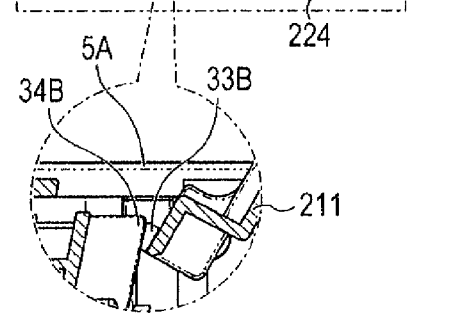

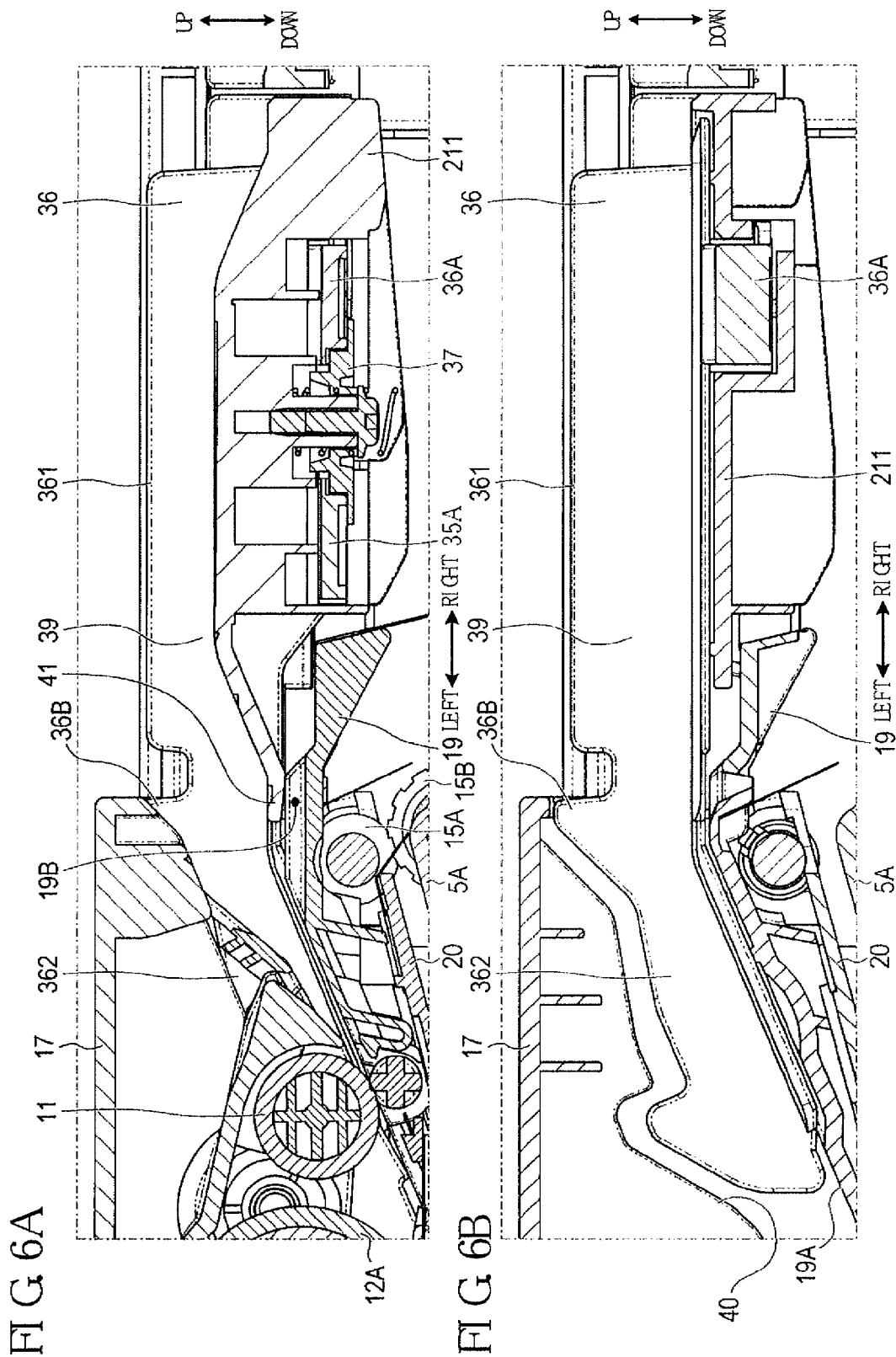

FIG. 7A
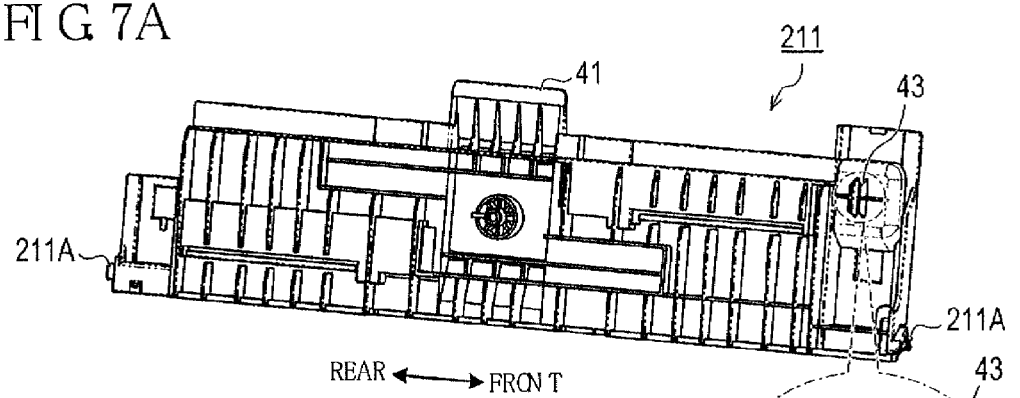
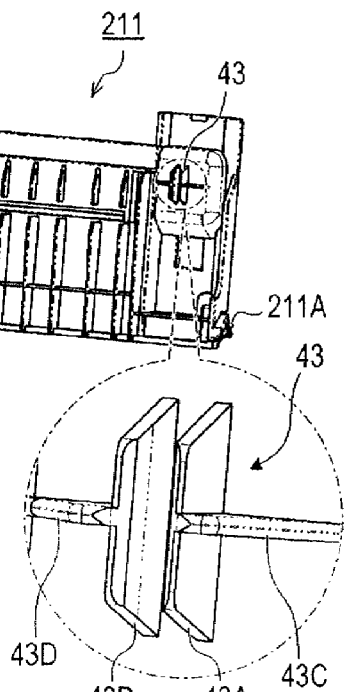
FIG. 7B
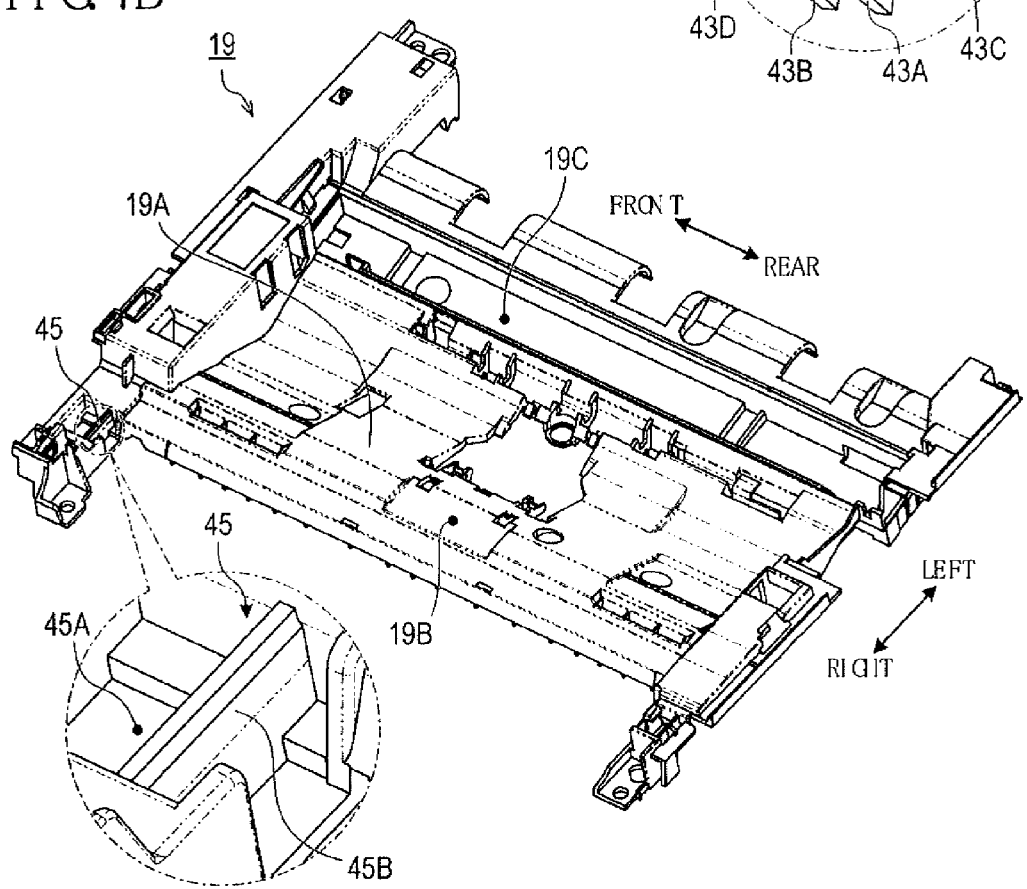

SHEET CONVEYING DEVICE AND IMAGE READING DEVICE WITH MOVABLE TRAY

CROSS REFERENCE TO RELATED APPLICATION

The present application claims priority from Japanese Patent Application No. 2013-271978, which was filed on Dec. 27, 2013, the disclosure of which is herein incorporated by reference in its entirety.

BACKGROUND

1. Technical Field

The following disclosure relates to a sheet conveying device and an image reading device.

2. Description of the Related Art

There is known an image reading device including an automatic document feeder (ADF) provided with side guides. These side guides are mounted on a document support surface of the ADF on which documents are to be placed, and the side guides can contact opposite edges of the documents in a widthwise direction to limit a position of each document placed on the document support surface. These side guides are moved in a direction perpendicular to a document conveying direction according to the size of documents placed on the document support surface and brought into contact with opposite edges of the documents in the widthwise direction. These operations position the documents, thereby aligning the documents in the widthwise direction on the document support surface. This alignment also corrects inclination of the documents with respect to the document conveying direction to prevent and suppress skew of each document.

In the conventional ADF, positioning members (i.e., the side guides) are slidably mounted on an upper guide which constitutes a base member of the ADF. Various components such as an output tray, an output roller, and a pinch roller are disposed under the upper guide.

SUMMARY

In recent years, reduction in thickness has usually been required for devices, such as an image reading device, including the above-described ADF. In the conventional ADF, a space large enough for a user to insert his or her hand is defined between the upper guide and the output tray. If the height dimension of this space can be reduced, the ADF can be made thinner accordingly.

However, if the space between the upper guide and the output tray is made smaller, it is difficult for the user to insert his or her hand into a back portion of the space. Thus, if a document jam (i.e., a sheet jam) has occurred near the output roller, for example, it is difficult to clear the jammed document. Also, in the case of a document having a short dimension in the conveying direction, the document is to be discharged onto a back portion of the output tray, making it difficult for the user to take out the document. Accordingly, solving these problems is required to reduce the height dimension of the space and accordingly to make the ADF thinner.

An aspect of the disclosure relates to a sheet conveying device and an image reading device allowing a user to easily clear a jam and being made thinner by reducing a height dimension of a space as a lower one of conveyance paths overlapping each other vertically.

In one aspect of the disclosure, a sheet conveying device includes: a conveyor configured to convey a sheet along a conveyance path; a first supporter configured to support a sheet to be conveyed by the conveyor; a second supporter configured to support the sheet discharged from the conveyor; and a side guide contactable with an edge portion of the sheet supported by the first supporter in a widthwise direction perpendicular to a conveying direction. The first supporter has a first part located over the second supporter in a state in which the first part and the second supporter are spaced apart from each other. At least a portion of the first part constitutes a first tray movable between an open position and a closed position. The side guide is provided on the first tray and configured to move with movement of the first tray. The first tray is configured such that when the first tray is located at the closed position, the first supporter supports the sheet, and when the first tray is located at the open position, a portion of the second supporter is exposed.

In another aspect of the disclosure, an image reading device includes: a conveyor configured to convey a sheet along a conveyance path; a reading device configured to read an image on a sheet being conveyed by the conveyor; a first supporter configured to support a sheet to be conveyed by the conveyor; a second supporter configured to support the sheet discharged from the conveyor; and a side guide contactable with an edge portion of the sheet supported by the first supporter in a widthwise direction perpendicular to a conveying direction. The first supporter has a first part located over the second supporter in a state in which the first part and the second supporter are spaced apart from each other. At least a portion of the first part constitutes a first tray movable between an open position and a closed position. The side guide is provided on the first tray and configured to move with movement of the first tray. The first tray is configured such that when the first tray is located at the closed position, the first supporter supports the sheet, and when the first tray is located at the open position, a portion of the second supporter is exposed.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIGS. 2A and 2B are views each illustrating an internal structure of an image reading device, wherein FIG. 2A is an elevational view in vertical cross section illustrating a state in which a first cover is closed, and FIG. 2B is an elevational view in vertical cross section illustrating a state in which the first cover is open;

FIG. 3A is a partial elevational view in vertical cross section illustrating a state in which a second cover and a first tray are open, FIG. 3B is a partial elevational view in vertical cross section illustrating a stopper provided at a front end portion of the first tray, and FIG. 3C is a partial elevational view in vertical cross section illustrating a stopper provided at a rear end portion of the first tray;

FIG. 6A is a cross-sectional view illustrating components around the first tray and taken at a center of the first tray in the front and rear direction, and FIG. 6B is a partial elevational view in vertical cross section illustrating components near a side guide provided in a rear portion of the MFP;

FIG. 7A is a perspective view illustrating a space definer provided on the first tray, and FIG. 7B is a perspective view illustrating a protrusion provided on the first guide member;

FIGS. 9A and 9B are views illustrating a protrusion and a space definer in an alternative embodiment, wherein FIG. 9A is a perspective view illustrating the space definer provided on the first tray, and FIG. 9B is a perspective view illustrating the protrusion provided on an ADF base member.

DETAILED DESCRIPTION OF THE EMBODIMENTS

Hereinafter, there will be described embodiments of the present disclosure by reference to the drawings.

Structure of MFP

Figure 1:
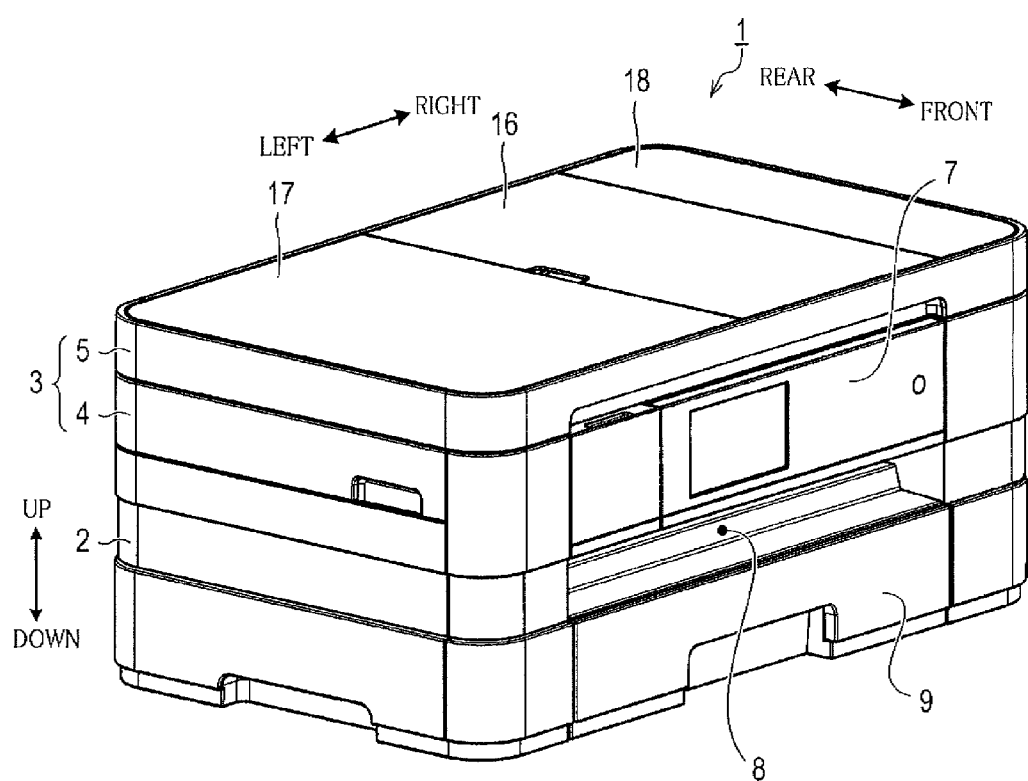
FIG. 1 is a perspective view of a multi-function peripheral (MFP)

A multi-function peripheral (MFP) 1 illustrated in FIG. 1 has configurations corresponding to a sheet conveying device and an image reading device. In the following explanation, up, down, right, left, front, and rear directions illustrated in the drawings are used to simply explain relative positional relationships between components and devices of the MFP 1.

The MFP 1 includes a main body unit 2 and a reading unit 3 (as one example of the image reading device) mounted on the main body unit 2. The reading unit 3 is mounted on the main body unit 2 so as to be opened and closed with respect to the main body unit 2. In the state in which the reading unit 3 is closed, an opening formed in an upper surface of the main body unit 2 is covered with the reading unit 3.

The reading unit 3 includes a flatbed portion (hereinafter referred to as "FB portion") 4 and an ADF portion 5 (as one example of the sheet conveying device) provided on the FB portion 4. The ADF portion 5 is mounted on the FB portion 4 so as to be opened and closed with respect to the FB portion 4. While being closed, the ADF portion 5 serves as a cover for covering an upper surface of the FB portion 4.

Devices provided in the main body unit 2 include a controller, an image forming device, a LAN communication device, and a PSTN communication device. An operation panel 7 for operations of a user is provided on a front upper portion of the main body unit 2. Under the operation panel 7, a takeout opening 8 is defined for the user to take out a recording medium on which an image has been formed by the image forming device. Under the takeout opening 8, a medium supply cassette 9 is mounted for accommodating recording media to be supplied to the image forming device.

In the reading unit 3, as illustrated in FIGS. 2A and 2B, the ADF portion 5 includes a conveying unit 10 for conveying a document along a predetermined conveyance path (indicated by the bold broken lines in FIG. 2B). This conveying unit 10 includes a supply roller 11, a separating roller 12A, a separating piece 12B, a relay roller 13, a conveying roller 14A, an upper pinch roller 14B, a lower pinch roller 14C, a discharge roller 15A, and an output pinch roller 15B.

As illustrated in FIGS. 1, 2A, and 2B, a first cover 16, a second cover 17, and a third cover 18 are provided on an upper surface of the ADF portion 5. The first cover 16, the second cover 17, and the third cover 18 constitute an exterior of the ADF portion 5 with an ADF base member 5A which constitutes a bottom portion and a side wall portion of the ADF portion 5. In the conveying unit 10, a first guide member 19 and a second guide member 20 are mounted on the ADF base member 5A. The ADF base member 5A, the second cover 17, the first guide member 19, and the second guide member 20 define a space serving as the conveyance path with the above-described rollers.

The first cover 16 is pivotable between a retracted position illustrated in FIG. 2A and a use position illustrated in FIG. 2B about a pivot shaft 16A provided at a right end portion of the first cover 16 located at the refracted position. The third cover 18 is pivotable between a horizontal position illustrated in FIG. 2A and an inclined position illustrated in FIG. 2B about a pivot shaft 18A provided at a right end portion of the third cover 18.

In the state in which the first cover 16 and the third cover 18 are located at their respective positions illustrated in FIG. 2A, bosses, not shown, provided at a distal end of an arm 16B extending from the first cover 16 are fitted in an arm receiver 18B formed in a lower surface of the third cover 18 to support the third cover 18 from a lower side thereof. That is, the arm 16B extending from the first cover 16 supports the lower surface of the third cover 18, so that the first cover 16 and the third cover 18 define a horizontal surface. Here, the term "horizontal" includes not only the case where the first cover 16 and the third cover 18 form a completely flat surface but also the cases where the first cover 16 and the third cover 18 have some recessions and protrusions and/or inclined portions, for example. When the first cover 16 is pivoted in this state from the retracted position to the use position, the bosses provided on the arm 16B are moved downward so as to move a left end portion of the third cover 18. This movement pivots the third cover 18 from the horizontal position illustrated in FIG. 2A to the inclined position illustrated in FIG. 2B in conjunction with the pivotal movement of the first cover 16.

When the first cover 16 is pivoted from the retracted position to the use position, the third cover 18 reaches the inclined position before the first cover 16 reaches the use position. At this timing, the bosses provided on the arm 16B come out of the arm receiver 18B, so that the first cover 16 is moved to the use position without moving the third cover 18. When the first cover 16 is pivoted from the use position to the retracted position, the first cover 16 is first pivoted without moving the third cover 18, but the bosses provided on the arm 16B are fitted into the arm receiver 18B at the timing before the first cover 16 reaches the retracted position. Thus, the bosses provided on the arm 16B thereafter move the left end portion of the third cover 18 upward until the first cover 16 reaches the retracted position. As a result, the third cover 18 is pivoted in conjunction with the first cover 16, and the third cover 18 reaches the horizontal position generally at the same time as the first cover 16 reaches the retracted position.

In the state in which the first cover 16 is located at the use position, the ADF portion 5 includes: a first supporter 21 for supporting a lower surface of a document to be supplied to the conveying unit 10; and a second supporter 22 for supporting a lower surface of a document discharged from the conveying unit 10. At least a portion (as one example of a first part) of the first supporter 21 and at least a portion of the second supporter 22 overlap each other in the up and down direction with a space formed therebetween, and the first supporter 21 is formed over the second supporter 22 while the second supporter 22 is formed below the first supporter 21.

As illustrated in FIGS. 2A and 2B, the first supporter 21 includes a first tray 211, a second tray 212, and a third tray 213. The first tray 211 supports a document at a position nearest to the conveying unit 10 among these three trays. The second tray 212 supports a document at a position farther from the conveying unit 10 than the first tray 211. The third tray 213 supports a document at a position farther from the conveying unit 10 than the second tray 212. The second supporter 22 includes a fourth tray 224 and a fifth tray 225. The fourth tray 224 supports a document at a position nearer to the conveying unit 10 than the fifth tray 225. The fifth tray 225 supports a document at a position farther from the conveying unit 10 than the fourth tray 224. The fifth tray 225 is constituted by one of opposite surfaces of the first cover 16, and the third tray 213 is attached to the one surface of the first cover 16, with a space being formed between the third tray 213 and the fifth tray 225. In this construction, when the first cover 16 is pivoted to the use position, the third tray 213 and the fifth tray 225 are disposed at positions constituting the first supporter 21 and the second supporter 22, respectively. When the first cover 16 is pivoted to the retracted position, the first cover 16 covers respective upper sides of the first tray 211 and the second tray 212, so that the third tray 213 and the fifth tray 225 displaced with the first cover 16 are stored in the ADF portion 5 in a state in which the third tray 213 and the fifth tray 225 face downward.

Each document placed on the first supporter 21 is conveyed along the conveyance path indicated by the bold broken lines in FIG. 2B and discharged onto the second supporter 22. That is, the conveying unit 10 conveys the document such that the document placed on the first supporter 21 is discharged onto the second supporter 22 via a U-turn path formed as a part of the conveyance path. The documents supplied by the supply roller 11 from the first supporter 21 to a downstream side thereof in the conveying direction are separated one by one by the separating roller 12A and the separating piece 12B. The separated document is conveyed by the relay roller 13 and the conveying roller 14A to a further downstream side in the conveying direction and discharged onto the second supporter 22 by the discharge roller 15A.

A first transparent member 25A and a first document pressing member 27A are provided respectively at positions along the conveyance path and between the conveying roller 14A and the discharge roller 15A. A second transparent member 25B and a second document pressing member 27B are provided respectively at positions along the conveyance path and between the relay roller 13 and the conveying roller 14A.

The first transparent member 25A is provided in the FB portion 4 while the second transparent member 25B, the first document pressing member 27A, and the second document pressing member 27B are provided in the ADF portion 5. In the present embodiment, each of the first transparent member 25A and the second transparent member 25B is constituted by a glass plate extending over the width of the document in a widthwise direction perpendicular to the document conveying direction (that is, the widthwise direction coincides with the front and rear direction in the present embodiment).

Each of the first document pressing member 27A and the second document pressing member 27B is formed of metal or a rigid resin material and extends over the width of the document like the first transparent member 25A and the second transparent member 25B.

The first document pressing member 27A is urged toward the first transparent member 25A by a spring, not shown, such that the document conveyed on an upper surface of the first transparent member 25A does not partly float from the first transparent member 25A. The second document pressing member 27B is urged toward the second transparent member 25B by a spring, not shown, such that the document conveyed on an upper surface of the second transparent member 25B does not partly float from the second transparent member 25B.

The FB portion 4 includes a third transparent member 25C, and the ADF portion 5 includes a third document pressing member 27C. In the present embodiment, the third transparent member 25C is constituted by a glass plate like the first transparent member 25A and the second transparent member 25B. The third transparent member 25C differs from the first transparent member 25A and the second transparent member 25B in that the third transparent member 25C has an area large enough for the entire conveyed document to be fitted on the third transparent member 25C.

The third document pressing member 27C is constituted by a stacked body constituted by a plastic form layer and a rigid resin film layer stacked on each other. When the ADF portion 5 is closed, the third document pressing member 27C is held in close contact with the third transparent member 25C with slight elastic deformation to prevent the document placed on the third transparent member 25C from floating from the third transparent member 25C.

The FB portion 4 includes a guide rail 29, a carriage 30, and a first image sensor 31A. The ADF portion 5 includes a second image sensor 31B. The guide rail 29 is formed integrally with an inner surface of a bottom portion of a housing 4A of the FB portion 4 and extends in the right and left direction from a lower side of the first transparent member 25A to a lower side of the third transparent member 25C in a state in which the guide rail 29 is parallel with respective lower surfaces of the first transparent member 25A and the third transparent member 25C.

When mounted on the guide rail 29, the carriage 30 is supported by the guide rail 29 so as to be reciprocable along the guide rail 29 in the right and left direction. This carriage 30 is connected to a timing belt, not shown, and reciprocated in the right and left direction by movement of the timing belt.

Each of the first image sensor 31A and the second image sensor 31B is constituted by a contact image sensor (CIS) in the present embodiment. The first image sensor 31A is mounted on the carriage 30 and reciprocated in the right and left direction with the carriage 30.

A spring, not shown, is provided between the first image sensor 31A and the carriage 30 to urge the first image sensor 31A upward. Spacers, not shown, are mounted near front and rear opposite ends of the first image sensor 31A in a state in which the spacers are urged upward with the first image sensor 31A. These spacers can be brought into contact with the lower surface of the third transparent member 25C or the first transparent member 25A.

In this construction, when the first image sensor 31A is reciprocated with the carriage 30, the spacers are kept in contact with the lower surface of the third transparent member 25C or the first transparent member 25A, and the first image sensor 31A is moved with a constant distance between the first image sensor 31A and the third transparent member 25C or the first transparent member 25A.

The second image sensor 31B is fixed to a predetermined position. This second image sensor 31B is also urged by a spring, not shown, toward the second transparent member 25B. As a result, a distance between the second image sensor 31B and the second transparent member 25B is kept constant.

A plurality of reading elements of each of the first image sensor 31A and the second image sensor 31B are arranged in the front and rear direction. When reading an image on the document placed on an upper surface of the third transparent member 25C, the first image sensor 31A reads the image while moving with the carriage 30.

When reading an image on the document conveyed by the conveying unit 10, the first image sensor 31A is located at a position under the first document pressing member 27A and the first transparent member 25A without moving and reads an image on the document conveyed on the upper surface of the first transparent member 25A. The second image sensor 31B, at a position under the second document pressing member 27B and the second transparent member 25B, reads an image on the document conveyed on the upper surface of the second transparent member 25B.

Details of First Supporter

As illustrated in FIG. 3A, the first tray 211 is displaceable between a closed position illustrated in FIG. 2B and an open position illustrated in FIG. 3A about a pivot shaft 211A provided at a right end portion of the first tray 211. This first tray 211 supports a document when located at the closed position. When the first tray 211 is moved to the open position, the fourth tray 224 located under the first tray 211 is partly exposed. As illustrated in FIG. 3B, the stopper 33A is provided at a front end portion of the first tray 211. As illustrated in FIG. 3C, the stopper 33B is provided at a rear end portion of the first tray 211.

For easier understanding of the position and size of the stopper 33A, FIG. 3B illustrates two views: a view illustrating components near the first tray 211 when viewed from a front side of the MFP 1 (outside the circle indicated by the one-dot chain line); and a cross-sectional view taken along a plane so as to illustrate the stopper 33A (inside the circle indicated by the one-dot chain line). For easier understanding of the position and size of the stopper 33B, FIG. 3C illustrates two views: a cross-sectional view illustrating components near the first tray 211 (outside the circle indicated by the one-dot chain line); and a cross-sectional view taken along a plane so as to illustrate the stopper 33B (inside the circle indicated by the one-dot chain line).

When the first tray 211 is moved from the closed position to the open position, the stoppers 33A, 33B are respectively brought into contact with contact portions 34A, 34B provided on the ADF base member 5A at the timing when the first tray 211 reaches the open position, so that the stoppers 33A, 33B prevent the first tray 211 from moving further from the open position. In the state in which the stoppers 33A, 33B are held in contact with the respective contact portions 34A, 34B, the first tray 211 is kept at the open position by its own weight. On the other hand, when the first tray 211 is moved from the open position to the closed position, a left end portion of the first tray 211 is brought into contact with an upper surface of a right end portion of the first guide member 19 at the timing when the first tray 211 reaches the closed position. As a result, the first tray 211 is kept at the closed position by its own weight.

Figure 4A:
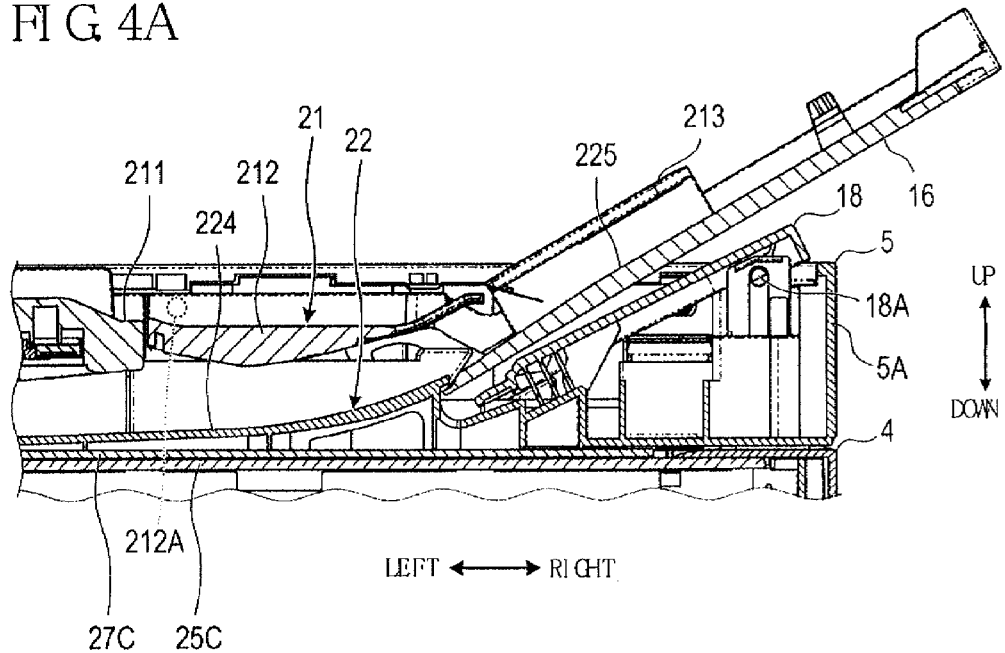
FIG. 4A is a partial elevational view in vertical cross section illustrating a closed state of a second tray.
Figure 4B:
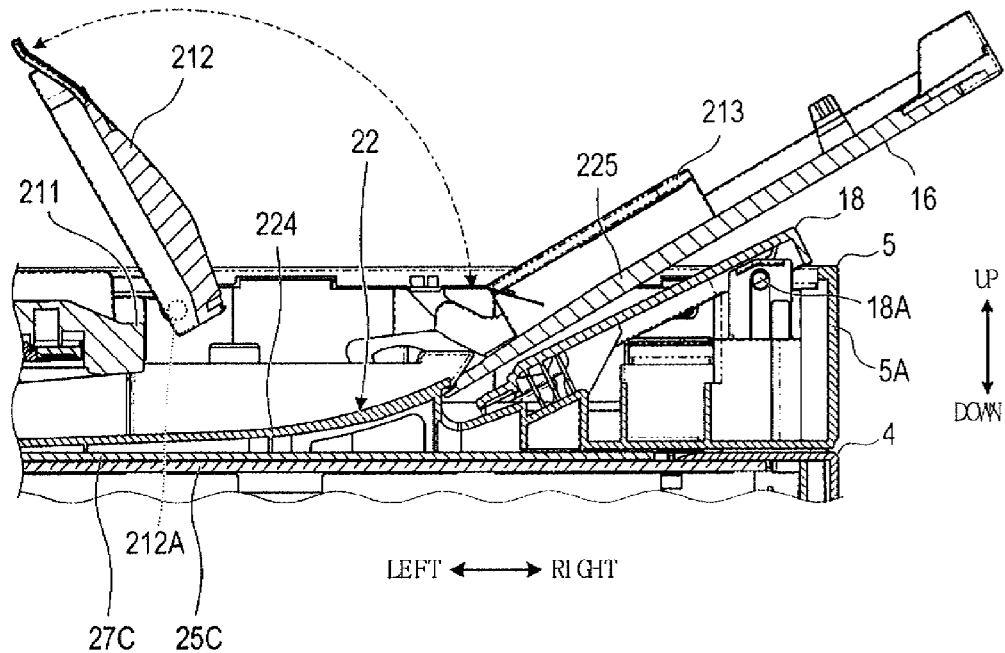
FIG. 4B is a partial elevational view in vertical cross section illustrating an open state of the second tray.

In the present embodiment, as illustrated in FIGS. 4A and 4B, the second tray 212 is mounted on the ADF base member 5A so as to be pivotable about a pivot shaft 212A between a closed position illustrated in FIG. 4A and an open position illustrated in FIG. 4B. This second tray 212 supports a document when located at the closed position. On the other hand, the second tray 212 is pivoted to the open position, the fourth tray 224 located under the second tray 212 is partly exposed.

Figure 5:
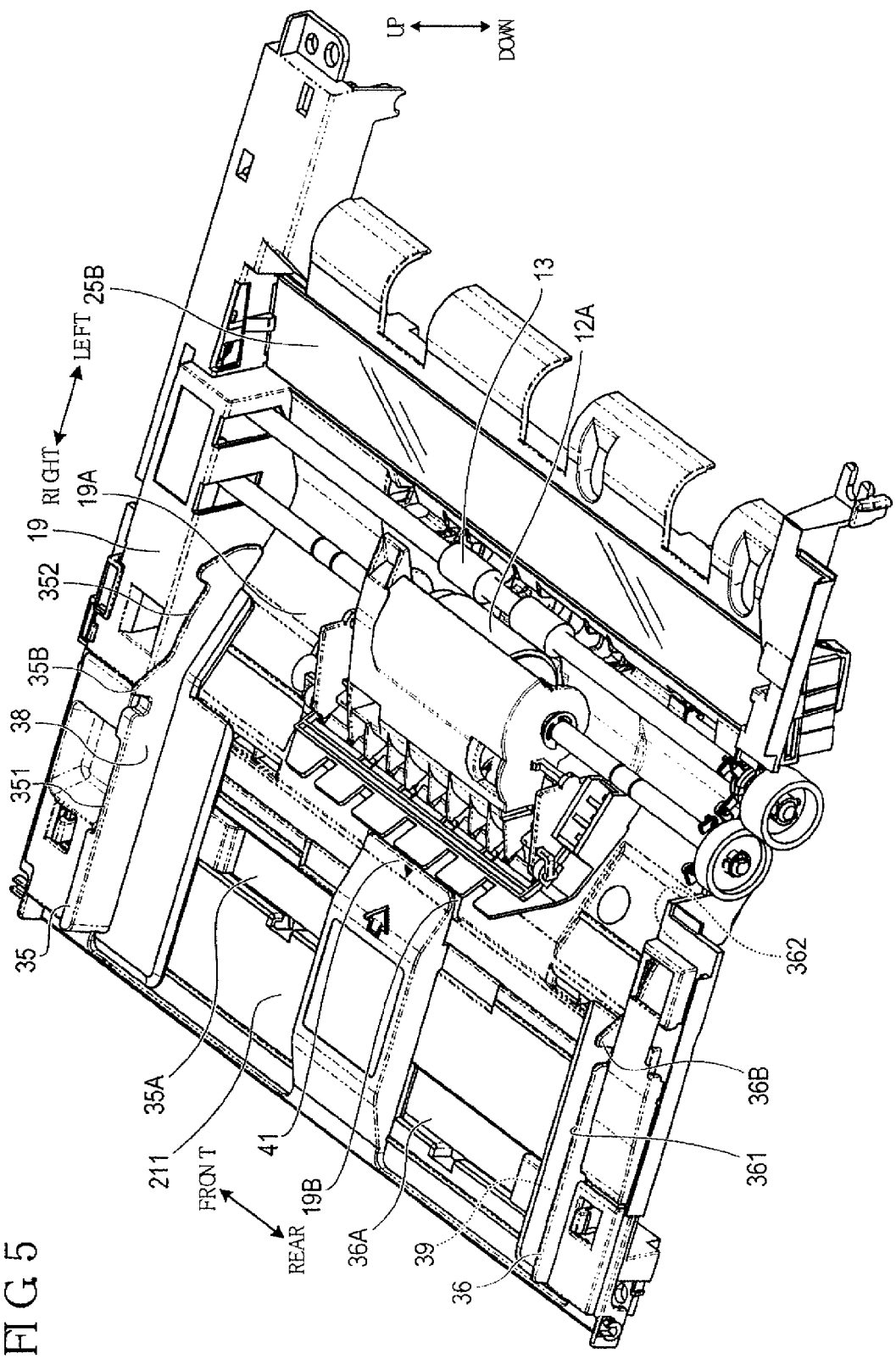
FIG. 5 is a perspective view illustrating a first tray, a side guide, a first guide member, and components provided near these components.

As illustrated in FIGS. 3A, 3B, and 5, the first tray 211 is provided with side guides 35, 36. As illustrated in FIG. 5, these side guides 35, 36 are provided spaced apart from each other in the widthwise direction perpendicular to the document conveying direction (i.e., in the front and rear direction). Each of the side guides 35, 36 is slidable in the front and rear direction relative to the first tray 211, and when one of the side guides 35, 36 is slid in one direction, the other of the side guides 35, 36 is slid in a direction opposite the one direction in conjunction with the sliding movement of the one of the side guides 35, 36. It is noted that the MFP 1 may be configured such that only one of the two side guides is movable, and the other of the two side guides is not movable. In this configuration, the MFP 1 may be configured such that the one side guide is provided on the first tray 211, and the other side guide is constituted by, e.g., a wall of a housing of the ADF portion 5.

Specifically, the side guide 35 is provided with a rack 35A extending rearward, and the side guide 36 is provided with a rack 36A extending frontward. As illustrated in FIG. 6A, a pinion 37 provided at a center of the first tray 211 in the front and rear direction is sandwiched between these racks 35A, 36A in the right and left direction, and each of the racks 35A, 36A is meshed with the pinion 37.

In this construction, when one of the side guides 35, 36 (e.g., the side guide 35) is slid, a corresponding one of the racks 35A, 36A (e.g., the rack 35A) rotates the pinion 37. This rotation of the pinion 37 slides the other rack (e.g., the rack 36A) in a direction opposite a direction in which the one rack is slid. As a result, the other side guide (e.g., the side guide 36) provided with the other rack is slid in the front and rear direction, specifically, in a direction opposite a direction in which the one side guide is slid, in a state in which the one and the other side guides are symmetric with respect to the pinion 37 in the front and rear direction.

The side guides 35, 36 respectively have document contact surfaces 38, 39 which face each other in the front and rear direction. When a document is placed on the first supporter 21, the document contact surfaces 38, 39 respectively contact opposite edge portions of the document in the widthwise direction to limit the document conveying direction to a predetermined direction.

The side guides 35, 36 include: respective portions 351, 361 extending along an upper surface of the first tray 211 in the state in which the first tray 211 is located at the closed position; and respective portions 352, 362 continuously extending from the respective portions 351, 361 to a downstream side of a downstream endportion of the first tray 211 in the document conveying direction. As illustrated in FIG. 5, each of the portions 352, 362 partly extends obliquely downward along a declining guide surface 19A of the first guide member 19, and as is apparent from FIGS. 6A and 6B, left ends of the respective side guides 35, 36 overlap the supply roller 11 when viewed from a front side of the MFP 1.

As illustrated in FIG. 6B, a plurality of ribs 40 are provided on a lower surface of the second cover 17 so as to extend downward. Specifically, the ribs 40 extending from the lower surface of the second cover 17 are arranged in parallel so as to be spaced apart from each other in the front and rear direction, and FIG. 6B illustrates one of these ribs 40. Lower ends of the respective ribs 40 define the document conveyance path so as to limit excessive upward displacement of the document. The side guides 35, 36 respectively have protruding portions 35B, 36B provided at positions nearer in the document conveying direction to the downstream end portions (i.e., the left ends) of the respective side guides 35, 36 than mounted positions on the first tray 211 (in the present embodiment, positions at which the racks 35A, 36A are respectively provided). These protruding portions 35B, 36B extend toward the second cover 17 in the state in which the second cover 17 is located at the closed position. Even in the case where portions of the side guides 35, 36 which are located downstream of the above-described mounted positions in the document conveying direction are raised toward the second cover 17 when the user slides the side guides 35, 36, the protruding portions 35B, 36B are brought into contact with a lower surface of a right end portion of the second cover 17. With this construction, the protruding portions 35B, 36B can prevent portions of the side guides 35, 36 other than the protruding portions 35B, 36B from contacting the ribs 40 when the side guides 35, 36 are slid. The lower surface of the right end portion of the second cover 17 is smooth enough not to generate loud abnormal sounds even when the side guides 35, 36 are in sliding contact with the second cover 17. Accordingly, when compared with the case where the portions of the side guides 35, 36 other than the protruding portions 35B, 36B are brought into contact with the ribs 40, it is possible to prevent and suppress the generation of the abnormal sounds due to such contact.

When the first tray 211 is pivoted, the side guides 35, 36 are also pivoted with the first tray 211. As illustrated in FIG. 3A, the second cover 17 is displaceable between a closed position illustrated in FIG. 2B and an open position illustrated in FIG. 3A about a pivot shaft 17A provided at a left end portion of the second cover 17. When both of the second cover 17 and the first tray 211 are located at their respective closed positions, left ends of the respective side guides 35, 36 are located below the second cover 17. Thus, when the second cover 17 is located at the closed position, the components such as the side guides 35, 36 obstruct the pivotal movement of the first tray 211 to the open position. When the second cover 17 is pivoted to the open position, the first tray 211 can be pivoted to the open position.

A holding portion 41 is provided at a central portion of the first tray 211 in the front and rear direction. When opening or closing the first tray 211, the user holds this holding portion 41 with his or her fingertip(s). Under a left end portion of the holding portion 41, as illustrated in FIG. 6A, a recess 19B is formed in an upper surface of the first guide member 19. This recess 19B forms a space between the left end portion of the holding portion 41 and the upper surface of the first guide member 19, making it possible for the user to easily hold the holding portion 41 with his or her fingertip(s). As illustrated in FIG. 6A, a leftmost end of the holding portion 41 is located on a left side of a rightmost end of the second cover 17 in the right and left direction. In this construction, it is difficult for the user to hold the left end of the holding portion 41 with his or her fingertip(s) in the state in which the second cover 17 is not open, thereby preventing the first tray 211 from being operated in the state in which the second cover 17 is not open.

In the present embodiment, when the first tray 211 is located at the closed position, a position of the first tray 211 in the widthwise direction is determined relative to the first guide member 19 as one example of a positioning member. More specifically, as illustrated in FIG. 7A, the first tray 211 includes a space definer 43, and as illustrated in FIG. 7B, the first guide member 19 has a protrusion 45. The space definer 43 includes: a pair of plate members 43A, 43B forming a space; and reinforcing members 43C, 43D for enhancing flexural rigidity of the plate members 43A, 43B so as for the plate members 43A, 43B not to be easily deformed. The protrusion 45 is constituted by a plate member 45B provided upright on an inner surface of a recess 45A formed in the first guide member 19, and a lower end portion, a left end portion, and a right end portion of the plate member 45B are formed integrally with the inner surface of the recess 45A so as for the plate member 45B not to be easily deformed. The width of the space defined by the plate members 43A, 43B and the thickness of the plate member 45B is the same as each other in dimension.

Figure 8:
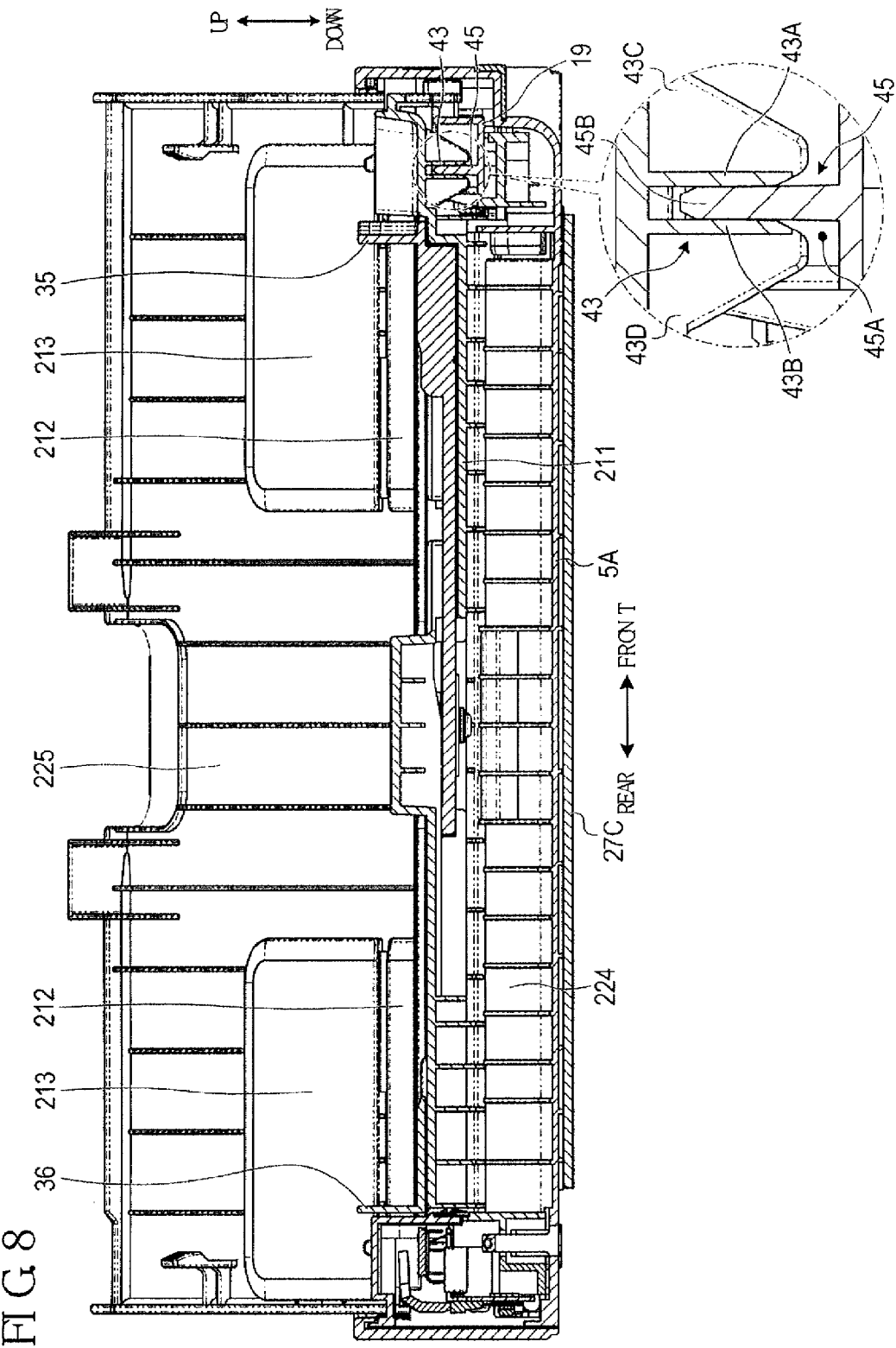
FIG. 8 is an elevational view in vertical cross section illustrating an area in which the space definer and the protrusion are fitted.

As illustrated in FIG. 8, when the first tray 211 is pivoted from the open position to the closed position, the space definer 43 is moved with the first tray 211 and tightly fitted onto the protrusion 45 such that the protrusion 45 is sandwiched between the space definer 43 in the front and rear direction. With this construction, the first guide member 19 and the first tray 211 are directly positioned to each other at least in the front and rear direction without any other components interposed therebetween.

As illustrated in FIG. 7B, the first guide member 19 has a sensor accommodating portion 19C, and the second image sensor 31B is mounted on this sensor accommodating portion 19C. Accordingly, only the first tray 211 and the first guide member 19 are provided between the second image sensor 31B and the side guides 35, 36, and when compared with the case where a multiplicity of components are provided between the second image sensor 31B and the side guides 35, 36 in addition to the first tray 211 and the first guide member 19, the side guides 35, 36 and the second image sensor 31B are accurately positioned to each other in the front and rear direction. Therefore, aligning the documents in the widthwise direction with the side guides 35, 36 prevents an image reading position from varying in the front and rear direction due to the individual differences of devices.

Effects

In the MFP 1 including the ADF portion 5 as described above, in the case where a sheet jam has occurred under an area on which the side guides 35, 36 are provided (i.e., the first tray 211), the user can clear the sheet jam in the state in which the second supporter 22 is partly exposed by the pivotal movement of the first tray 211 to the open position. Accordingly, when compared with the conventional device employing a construction in which the area on which the side guides 35, 36 are provided cannot be displaced, the user may easily remove the sheet jam (especially, a sheet jam near the discharge roller 15A). Also, in the case where a document having a short length in the conveying direction is discharged on the second supporter 22, the user may pivot the first tray 211 to the open position to take out the document. With these constructions, an excessively large height dimension is not required for the space defined between the first supporter 21 and the second supporter 22, whereby the height dimension of the space may be reduced to make the ADF portion 5 thinner.

In the above-described MFP 1, in the case where a sheet jam has occurred under the second tray 212, the user may clear the sheet jam in the state in which the second supporter 22 is partly exposed by the pivotal movement of the second tray 212 to the open position. Accordingly, the excessively large height dimension is not required for the space defined between the first supporter 21 and the second supporter 22 also at the area on which the second tray 212 is provided, thereby making the ADF portion 5 further thinner.

In the above-described MFP 1, when the ADF portion 5 is not used, the first tray 211 and the second tray 212 can be covered with the first cover 16, it is possible to prevent and suppress soil and damage to the first tray 211 and the second tray 212.

When the first tray 211 is pivoted to the open position, the downstream end portion of the first tray 211 in the document conveying direction is moved away from the conveying unit 10 while being displaced in a direction including an upward component. Accordingly, even in the case where the side guides 35, 36 extend over the end portion of the first tray 211, the first tray 211 is moved upward away from the conveying unit 10 without collision of the portions of the respective side guides 35, 36 which extend from the end portion of the first tray 211. Also, the side guides 35, 36 thus extend long enough toward the downstream side in the document conveying direction, whereby the side guides 35, 36 can guide the document more reliably. In particular, the side guides 35, 36 extend obliquely downward along the guide surface 19A of the first guide member 19, and accordingly when compared with the case where the document is guided within an area on the first tray 211, the document can be guided more reliably.

The above-described MFP 1 includes the second cover 17 described above, the second cover 17 may prevent and suppress soil and damage to the conveying unit 10. In addition, when the second cover 17 is located at the closed position, the first tray 211 is not pivoted from the closed position to the open position, and accordingly even if an unexpected external force is applied to the first tray 211, the first tray 211 is not pivoted to the open position unintentionally.

In the above-described MFP 1, the side guides 35, 36 have the respective protruding portions 35B, 36B, preventing generation of abnormal sounds when the side guides 35, 36 are slid by the user.

In the above-described MFP 1, the space definer 43 and the protrusion 45 may be used to easily optimize the position of the first tray 211 in the widthwise direction (i.e., its position in the front and rear direction), thereby accurately positioning the second image sensor 31B and the side guides 35, 36 to each other.

Alternative Embodiments

While the embodiment has been described above, it is to be understood that the disclosure is not limited to the details of the illustrated embodiment, but may be embodied with various changes and modifications, which may occur to those skilled in the art, without departing from the spirit and scope of the disclosure.

Figure 9A:
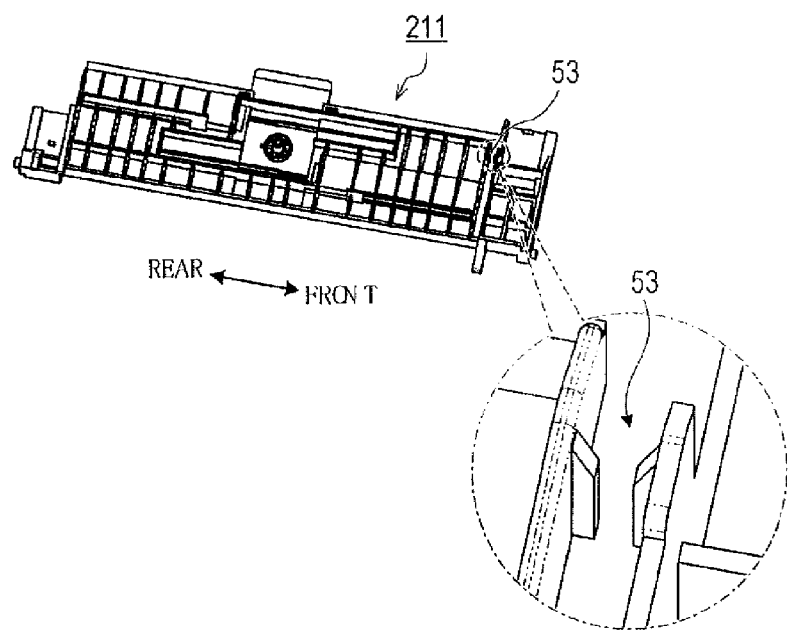
Figure 9B:
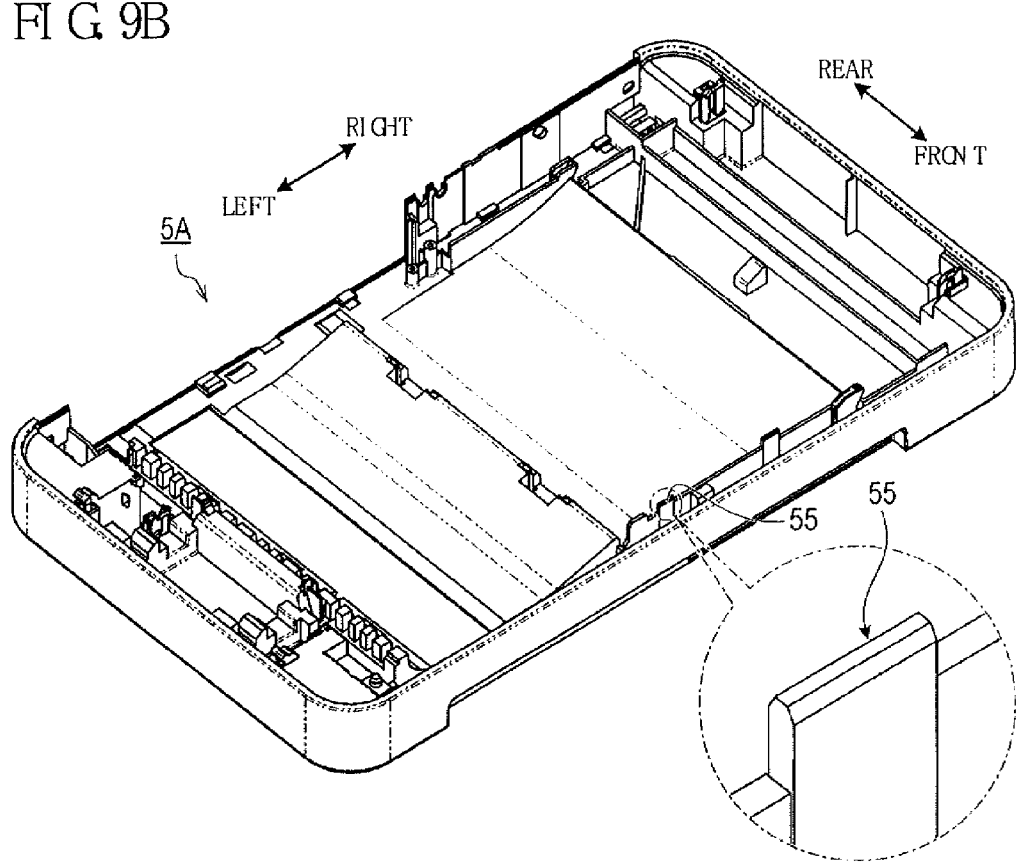
Figure 10:
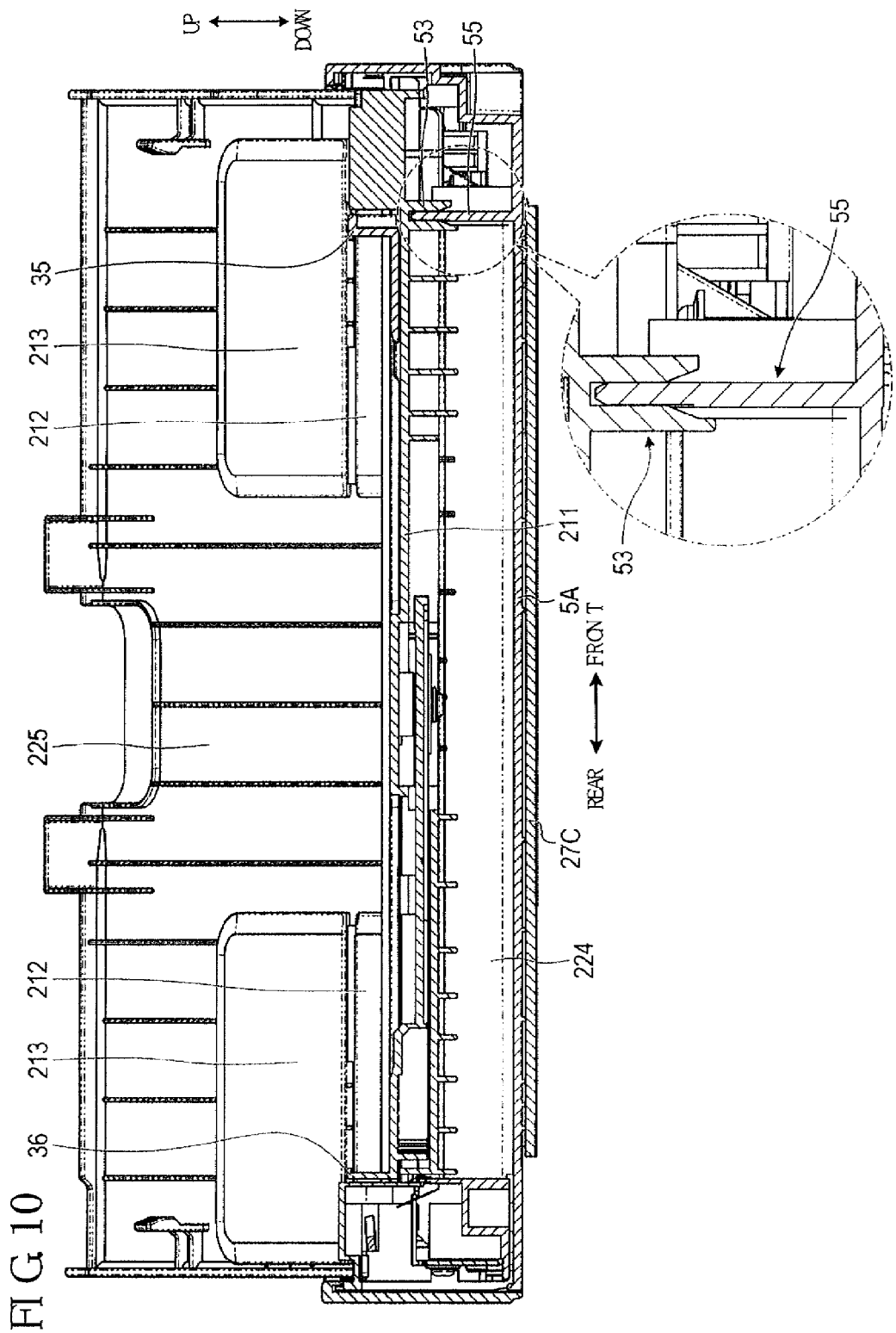
FIG. 10 is an elevational view in vertical cross section illustrating an area in which the space definer and the protrusion are fitted in the alternative embodiment.

In the above-described embodiment, for example, the first tray 211 includes the space definer 43, and the first guide member 19 has the protrusion 45. However, a components different from the first guide member 19 may be used as the positioning member. More specifically, the MFP may be configured such that as illustrated in FIG. 9A, the first tray 211 includes a space definer 53, and as illustrated in FIG. 9B, the ADF base member 5A has a protrusion 55. In this construction, as illustrated in FIG. 10, when the first tray 211 is pivoted from the open position to the closed position, the space definer 53 is tightly fitted onto the protrusion 55 such that the protrusion 45 is sandwiched between the space definer 53 in the front and rear direction, whereby the ADF base member 5A and the first tray 211 are directly positioned to each other. The ADF base member 5A is positioned to the reading unit 3 most accurately among the components of the ADF portion 5. Accordingly, in this construction, the first image sensor 31A and the side guides 35, 36 are accurately positioned to each other in the front and rear direction, making it possible to prevent the image reading position from varying in the front and rear direction due to the individual differences of devices.

While the first image sensor 31A and the second image sensor 31B are provided in the reading unit 3 in the above-described embodiment, a structure corresponding to the second image sensor 31B may not be provided. In the case where the structure corresponding to the second image sensor 31B is not provided, the construction in which the ADF base member 5A and the first tray 211 are directly positioned to each other as described above is preferably employed.

While the space definers 43, 53 are provided on the first tray 211 in the above-described embodiment, the MFP may be configured such that the space definers 43, 53 are provided on the first guide member 19 or the ADF base member 5A, and the protrusions 45, 55 are provided on the first tray 211.

While the reading unit 3 is provided in the MFP 1 in the above-described embodiment, the present disclosure may be applied to a reading unit constructed as an image scanner device having a single function.

What is claimed is:

1. A sheet conveying device, comprising:
a conveyor configured to convey a sheet along a conveyance path;
a first supporter configured to support a sheet to be conveyed by the conveyor;
a second supporter configured to support the sheet discharged from the conveyor; and
a side guide contactable with an edge portion of the sheet supported by the first supporter in a widthwise direction perpendicular to a conveying direction,
the first supporter comprising a first part located over the second supporter in a state in which the first part and the second supporter are spaced apart from each other,
at least a portion of the first part constituting a first tray movable between an open position and a closed position,
the side guide being provided on the first tray and configured to move with movement of the first tray,
the first tray being configured such that when the first tray is located at the closed position, the first supporter supports the sheet, and when the first tray is located at the open position, a portion of the second supporter is exposed,
wherein at least a portion of the first part which is located on an opposite side of the first tray from the conveyor constitutes a second tray movable between an open position and a closed position,
wherein the sheet conveying device further comprises a first cover movable between an open position and a closed position, and
wherein when the first cover is located at the closed position, the first cover covers respective upper portions of the first tray and the second tray, and when the first cover is located at the open position, the first cover establishes a state in which the first tray and the second tray are exposed.

2. The sheet conveying device according to claim 1, wherein the first supporter is configured to support the sheet being conveyed by the conveyor toward a reading device configured to read an image on the sheet, and wherein the second supporter is configured to support the sheet having the image read by the reading device and discharged by the conveyor.

3. The sheet conveying device according to claim 1, wherein when the first tray is located at the closed position, a distance between the conveyor and a downstream end portion of the first tray in the conveying direction is less than a distance between the conveyor and an upstream edge portion of the first tray in the conveying direction, and wherein when the first tray is pivoted from the closed position to the open position about a pivot shaft located upstream of the first tray in the conveying direction, the downstream end portion of the first tray in the conveying direction is moved upward away from the conveyor.

4. The sheet conveying device according to claim 3, wherein the side guide comprises:
a first portion extending along an upper surface of the first tray when the first tray is located at the closed position; and
a second portion continued from the first portion and extending to a position located downstream of the downstream edge portion of the first tray in the conveying direction.

5. The sheet conveying device according to claim 4, further comprising a guide surface inclined downward toward a downstream side in the conveying direction and disposed at a position adjacent to the first tray and located downstream of the first tray in the conveying direction when the first tray is located at the closed position,
wherein a portion of the side guide which extends to a position located downstream of the downstream end portion of the first tray in the conveying direction extends obliquely downward along the guide surface.

6. The sheet conveying device according to claim 1, wherein the first tray comprises a stopper configured to, when the first tray is moved to the open position, contact a specific portion to inhibit the first tray from being further opened from the open position.

7. The sheet conveying device according to claim 6, wherein when the stopper is held in contact with the specific portion, the first tray is kept at the open position by an own weight of the first tray.

8. The sheet conveying device according to claim 7, wherein when the first tray is moved to the closed position, the first tray contacts a predetermined portion and is kept at the open position by the own weight of the first tray in the state in which the first tray is held in contact with the predetermined portion.

9. The sheet conveying device according to claim 1, wherein the conveyor is configured to convey the sheet such that the sheet supported by the first supporter is discharged onto the second supporter via a curved path formed as a portion of the conveyance path.

10. A sheet conveying device, comprising:
a conveyor configured to convey a sheet along a conveyance path;
a first supporter configured to support a sheet to be conveyed by the conveyor;
a second supporter configured to support the sheet discharged from the conveyor; and
a side guide contactable with an edge portion of the sheet supported by the first supporter in a widthwise direction perpendicular to a conveying direction,
the first supporter comprising a first part located over the second supporter in a state in which the first part and the second supporter are spaced apart from each other,
at least a portion of the first part constituting a first tray movable between an open position and a closed position,
the side guide being provided on the first tray and configured to move with movement of the first tray,
the first tray being configured such that when the first tray is located at the closed position, the first supporter supports the sheet, and when the first tray is located at the open position, a portion of the second supporter is exposed,
wherein the sheet conveying device further comprises a second cover movable between an open position and a closed position,
wherein the second cover is configured such that when the second cover is located at the closed position, the second cover covers an upper portion of the conveyor and inhibits the first tray from moving from the closed position to the open position, and when the second cover is located at the open position, the conveyor is exposed, and the second cover does not inhibit the first tray from moving from the closed position to the open position.

11. The sheet conveying device according to claim 10, wherein the side guide is mounted on the first tray slidably in the widthwise direction at a mounted position located upstream, in the conveying direction, of a downstream end portion of the side guide in the conveying direction,
wherein the side guide comprises a protruding portion located downstream of the mounted position in the conveying direction, and the protruding portion protrudes toward the second cover when the second cover is located at the closed position, and
wherein when a portion of the side guide which is located downstream of the mounted position in the conveying direction is moved toward the second cover, the protruding portion is brought into contact with a specific portion of the second cover such that portions of the side guide other than the protruding portion do not contact the second cover.

12. A sheet conveying device, comprising
a conveyor configured to convey a sheet along a conveyance path;
a first supporter configured to support a sheet to be conveyed by the conveyor;
a second supporter configured to support the sheet discharged from the conveyor; and
a side guide contactable with an edge portion of the sheet supported by the first supporter in a widthwise direction perpendicular to a conveying direction,
the first supporter comprising a first part located over the second supporter in a state in which the first part and the second supporter are spaced apart from each other,
at least a portion of the first part constituting a first tray movable between an open position and a closed position, the side guide being provided on the first tray and configured to move with movement of the first tray, the first tray being configured such that when the first tray is located at the closed position, the first supporter supports the sheet, and when the first tray is located at the open position, a portion of the second supporter is exposed, wherein the sheet conveying device further comprises a positioning member configured to position a position of the first tray in the widthwise direction when the first tray is located at the closed position, wherein one of the first tray and the positioning member comprises a space definer configured to define a space in the widthwise direction, and wherein another of the first tray and the positioning member comprises a protrusion configured to be fitted in the space to limit movement of the first tray in the widthwise direction when the first tray is located at the closed position.

13. An image reading device, comprising:

a conveyor configured to convey a sheet along a conveyance path;

a reading device configured to read an image on a sheet being conveyed by the conveyor;

a first supporter configured to support a sheet to be conveyed by the conveyor;

a second supporter configured to support the sheet discharged from the conveyor; and a side guide contactable with an edge portion of the sheet supported by the first supporter in a widthwise direction perpendicular to a conveying direction, the first supporter comprising a first part located over the second supporter in a state in which the first part and the second supporter are spaced apart from each other, at least a portion of the first part constituting a first tray movable between an open position and a closed position, the side guide being provided on the first tray and configured to move with movement of the first tray, the first tray being configured such that when the first tray is located at the closed position, the first supporter supports the sheet, and when the first tray is located at the open position, a portion of the second supporter is exposed, wherein at least a portion of the first part which is located on an opposite side of the first tray from the conveyor constitutes a second tray movable between an open position and a closed position, wherein the sheet conveying device further comprises a first cover movable between an open position and a closed position, and wherein when the first cover is located at the closed position, the first cover covers respective upper portions of the first tray and the second tray, and when the first cover is located at the open position, the first cover establishes a state in which the first tray and the second tray are exposed.

14. The image reading device according to claim 13, wherein the first supporter is configured to support the sheet being conveyed by the conveyor toward the reading device, and wherein the second supporter is configured to support the sheet having the image read by the reading device and discharged by the conveyor.

* * * * *